United States Patent [19]
Miller et al.

[11] Patent Number: 5,044,254
[45] Date of Patent: Sep. 3, 1991

[54] RECIPROCATING AIR MOTOR

[75] Inventors: Alan N. Miller, New City; Stanley E. Mayer, Bronx; John Sullivan, Wappinger Falls, all of N.Y.

[73] Assignee: Coltene/Whaldent, Inc., New York, N.Y.

[21] Appl. No.: 649,849

[22] Filed: Feb. 1, 1991

[51] Int. Cl.⁵ ............................ F01L 31/00; F01L 21/00
[52] U.S. Cl. ........................................ 91/277; 91/218; 60/370; 92/13.5; 92/256
[58] Field of Search .................... 91/218, 277; 60/370; 92/255, 256, 220, 13, 13.5, 171.1

[56] References Cited
U.S. PATENT DOCUMENTS

| 13,882 | 2/1915 | Palmros | 60/370 |
| 2,223,792 | 12/1940 | Muir | 92/13.5 |
| 3,456,744 | 7/1969 | Altschuler | 91/217 |
| 3,892,280 | 7/1975 | Klushin et al. | 173/139 |
| 4,681,172 | 7/1987 | Mikiya et al. | 91/217 |

Primary Examiner—Edward K. Look
Assistant Examiner—Hoang Nguyen
Attorney, Agent, or Firm—Helfgott & Karas

[57] ABSTRACT

A vibration cancellation device is provided for an air motor with a reciprocating drive piston. The device consists of an anti-phase piston which is axially aligned with the drive piston and reciprocates in the opposite direction of the drive piston. In one embodiment, the stroke of the anti-phase piston is adjustable to permit optimizing its vibration cancellation characteristics.

23 Claims, 6 Drawing Sheets

RECIPROCATING AIR MOTOR

BACKGROUND OF THE INVENTION

This invention relates to a reciprocating air motor, and more particularly to an air motor with an anti-phase piston which cancels the vibrations of a drive piston to provide an air motor which is less vibrational, quieter and permits greater accuracy in its manipulation. In addition, this invention relates to the use of air cushions between the pistons and at their ends to cause a floating action to the pistons. An adjustable air space adjacent the anti-phase piston is also provided to permit optimizing the vibration cancellation. Furthermore, this invention contemplates reducing operational noise by muffling the sound of the reciprocating motor. The manufacturability of the motor is improved by utilizing structures which permit greater manufacturing tolerances.

In the field, of reciprocating air motors which are often referred to as pneumatic motors, there have been various motor designs aimed at reducing vibration. The effort to reduce vibration has mainly concentrated on pneumatic impact tools which transmit vibrations to an operator when the tool impacts a surface. Examples of pneumatic tools which generally transmit the full recoil reaction of the tool to the operator, are pneumatic chippers, tampers, jack-hammers, and the like.

Reciprocating air motors for saws, drills and the like, while they do not impart to the operator the large amplitude forces associated with the recoil reaction of impact tools, are nevertheless rendered less useful by the vibrations imparted to the operator. In particular the vibrations cause the operator to tire and require frequent rest periods, and in addition have relegated pneumatic saws to gross cutting operations since the vibrations have prevented fine detail cutting operations.

In U.S. Pat. No. 4,681,172, there is disclosed a vibration reducing cushioning device for use with a pneumatic impact tool. The cushioning is achieved by admitting air into a cushioning region to provide a first level of cushioning and then admitting air from the cushioning region into a second region to provide a second level of cushioning. Another example of a method of reducing vibration in a pneumatic impact tool is set forth in U.S. Pat. No. 3,456,744 in which a drive piston which impacts the tool is surrounded by a sleeve which moves in the opposite direction to offset the vibrations caused by the rebounding of the drive piston from the tool. A further example of a design for reducing vibrations in a pneumatic impact tool is described in U.S. Pat. No. 3,892,280 in which an additional piston or extension is added to a drive or hammer piston to reduce pressure fluctuations when the hammer piston and the housing move relative to one another.

While the aforementioned arrangements for reducing vibration in pneumatic tools have provided the reduced transmission of vibrations to a tool operator, still further improvements in reducing vibrations would be beneficial. These improvements would be particularly beneficial if they can be achieved together with reducing the noise level of the motor.

SUMMARY OF THE INVENTION

Accordingly, it is an object of the present invention to provide an improved reciprocating air motor.

A further object of the present invention is to provide a reciprocating air motor with improved vibration cancellation.

A still further object of the present invention is to provide an air motor with an anti-phase piston which cancels the vibrations of the drive piston.

Another object of the present invention is to provide an air motor which has air pathways from the air input to the pistons which reduce vibration and noise.

Still another object of the present invention is to provide an air motor which has air pathways for the exhaust air which reduce vibration and noise.

A still further object of the present invention is to provide a reciprocating air motor with minimal vibration by the use of axially aligned pistons which move in anti-phase relationship and which are air cushioned at each end of each stroke.

Another object of the present invention is to provide a mechanism for adjusting the stroke of the anti-phase piston to permit optimizing the vibration cancellation.

Another object of the present invention is to provide vibration cancellation optimization through adjusting the weight of the anti-phase piston.

Another object of the present invention is to provide an air motor which is designed to work over a range of manufacturing tolerances.

A still further object of the present invention is to provide an air motor with pistons which are adjustable so as to vary the size of the air inlets to accommodate a range of manufacturing tolerances.

A further object of the present invention is to provide an air motor with a flexible connection between the drive piston and a tool so as to accommodate a range of manufacturing tolerances.

Another object of the present invention is to provide a reciprocating air motor which provides a noise reducing pathway for the exhaust air to remove the air from the vicinity of the operator.

Briefly in accordance with the invention a drive piston is connected to a tool such as a saw. The drive piston is housed in a cylinder and reciprocates therein. An antiphase piston is also housed in the cylinder, is axially aligned with the drive piston, and reciprocates in the cylinder. When compressed air is fed to the pistons, a means for delivering air to the pistons and for exhausting air from the pistons are arranged so that the pistons move in opposite directions from one another. The opposite movement of the axially aligned anti-phase piston causes the vibrations of the drive piston to be substantially cancelled.

Vibrations can be further reduced by having the weight of the anti-phase piston equal to the weight of the drive piston, the tool and the mechanisms for connecting the piston to the tool. Also, further vibration reduction and reduction of the operating noise of the tool can be accomplished by providing barriers and walls around which the incoming and exhaust air must travel to muffle the air.

In an embodiment of the invention the exhaust air is removed from the area of the operator by feeding it through a hose surrounding the air inlet tube which delivers air to the motor. The hose includes a porous medium such as foam to reduce the noise caused by the exhaust air moving through the hose.

In another embodiment of the invention, a mechanism is provided to adjust the air space adjacent the anti-phase piston to permit optimizing the vibration cancellation.

In further embodiments of the invention, various alternate arrangements are provided to permit greater flexibility in accommodating manufacturing tolerances. In particular the pistons are provided with adjustable air inlets which can be adjusted to align with the air feed paths. Furthermore, flexible connections are provided between the drive piston and the tool. Also, partition walls are provided to isolate the air feed paths from the air exhaust paths.

The aforementioned objects, features and advantages of the invention, will, in part, be pointed out with particularity, and will, in part, become obvious from the following more detailed description of the invention taken, in part, with the drawings which form an integral part thereof.

BRIEF DESCRIPTION OF THE DRAWINGS

In the drawings.

In the various figures of the drawings like reference characters designate like parts.

DETAILED DESCRIPTION OF THE PREFERRED EMBODIMENT

Figure 1:
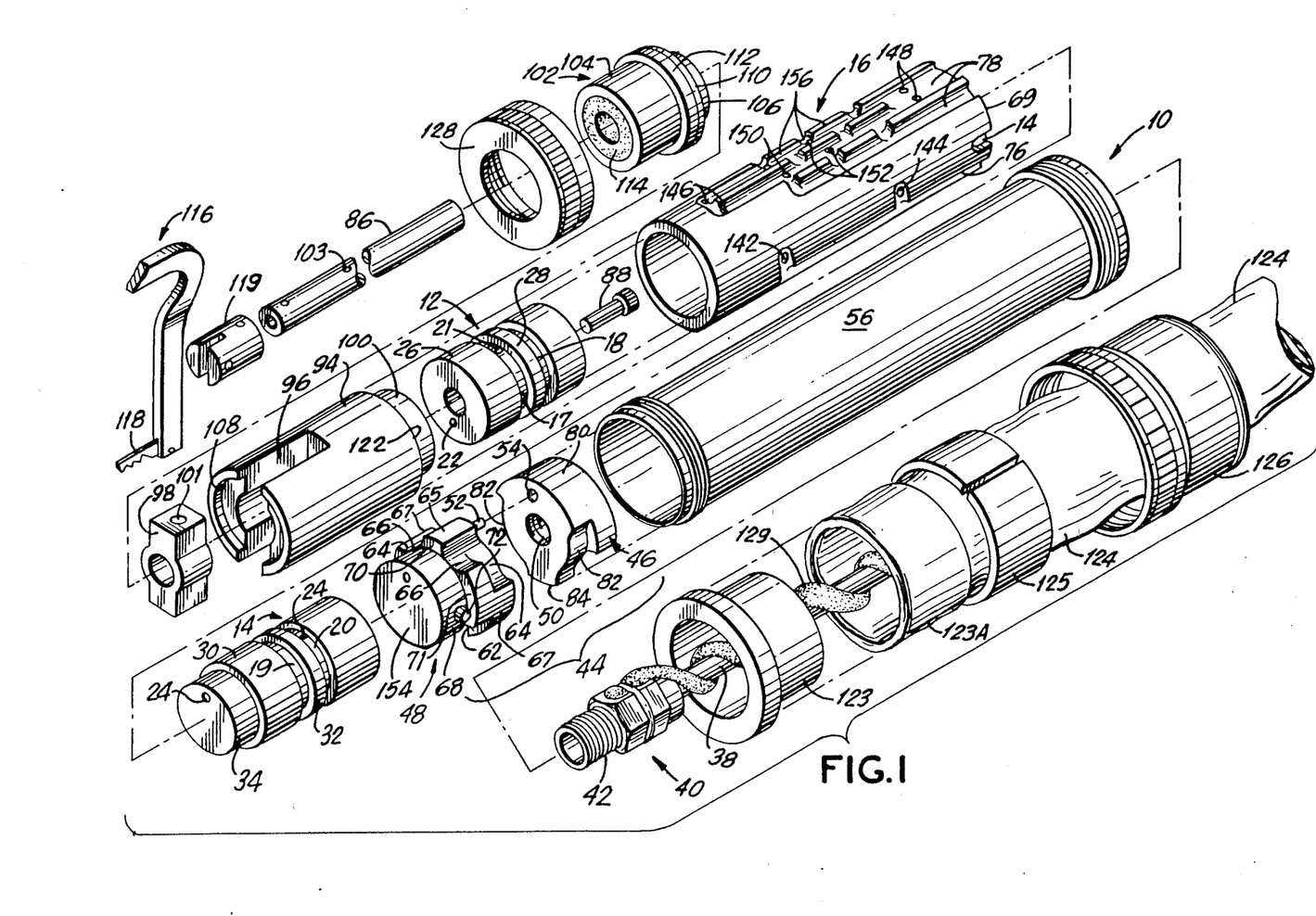
FIG. 1 is an exploded perspective view of a reciprocating air motor made in accordance with the principles of the present invention.
Figure 3:
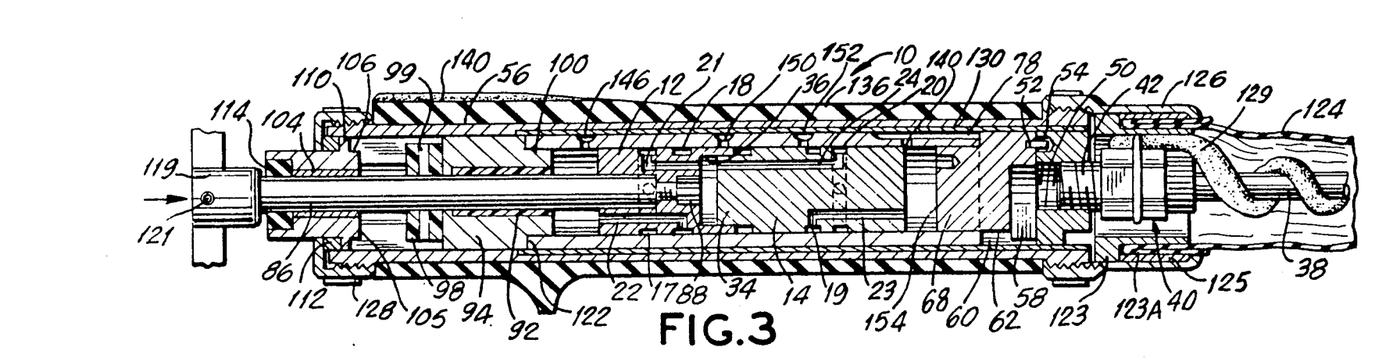
FIG. 3 is a cross sectional view of the air motor shown in FIG. 2 taken along line 3—3 with the drive piston fully retracted.

Referring now to the drawings, in FIG. 1 there is shown an exploded perspective view and in FIG. 3 there is shown a cross sectional view of a reciprocating air motor generally designated as 10 made in accordance with the principles of the present invention. The motor 10 includes a cylindrical drive piston 12 and cylindrical anti-phase piston 14 which are housed in axial alignment in a cylinder 16 for axial movement therein. Drive piston 12 and anti-phase piston 14 each have annular air inlets 17, 18 and 19, 20, respectively. The air inlets 17, 18 have smaller diameters than the outer cylindrical surfaces 26 of the drive piston 12, and are separated from one another by a separation ring 28 which is an integral part of the piston and has an outer diameter equal to the diameter of surfaces 26. The air inlets 19, 20 have smaller diameters than the outer cylindrical surfaces 30 of the piston 14, and are separated from one another by a separation ring 32 which is an integral part of the piston and has an outer diameter equal to the diameter of surfaces 30. Anti-phase piston 14 has a reduced diameter forward protrusion 34 which during reciprocation enters and leaves a receptacle 36 in the rear of the drive piston 12. The pistons may be made of any suitable material, e.g., machined copper and are finished to provide a slip fit between the pistons and the cylinder 16. The separation rings 28 and 32 may be formed by machining the air inlets 17, 18 and 19, 20, respectively.

Air inlet 17 in drive piston 12 communicates with an inlet tunnel 21 which begins at inlet 17 and travels radially into the piston 12 and then makes a right angle turn and continues longitudinally through the piston 12 terminating at the back end of the piston. Air inlet 18 in drive piston 12 communicates with an inlet tunnel 22 which begins at inlet 18 and travels radially into the piston 17 and then makes a right angle turn, and continues longitudinally through the piston 12 terminating at the front end of piston 12. Similarly, air inlet 19 in anti-phase piston 14 communicates with an inlet tunnel 23 which begins at inlet 19 and travels radially into the piston 14 and then makes a right angle turn, continues longitudinally through piston 14 terminating at the back end of the piston. Air inlet 20 in drive piston 14 communicates with an inlet tunnel 24 which begins at inlet 20 and travels radially into the piston 14 and then makes a right angle turn, continues longitudinally through piston 14 terminating at the front end of the piston 14.

Figure 2:
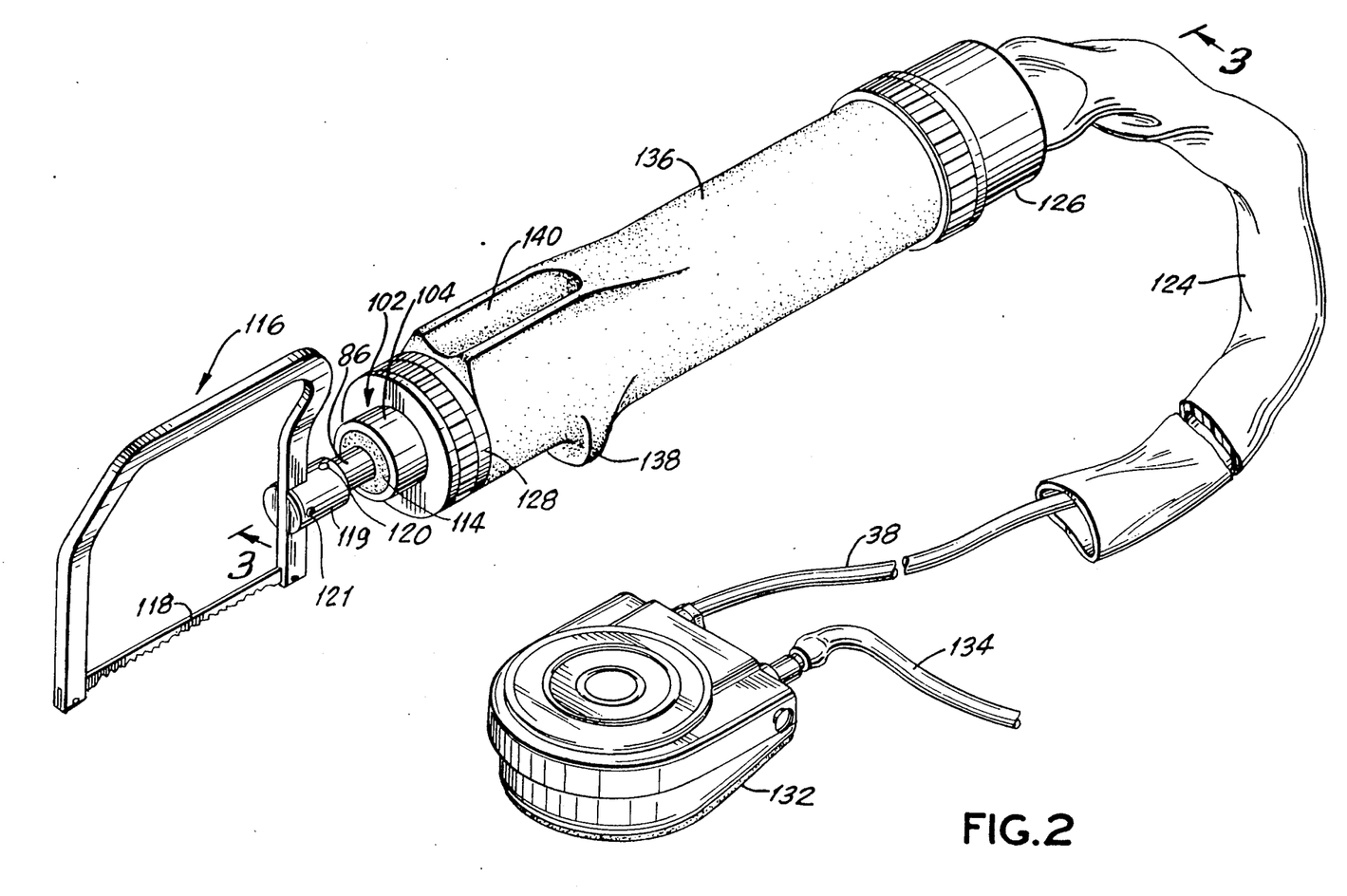
FIG. 2 is an overall perspective view of the air motor shown in FIG. 1, assembled and placed in a hand grip, and connected to a saw and an air switch for activating the motor.
Figures 5, 7:
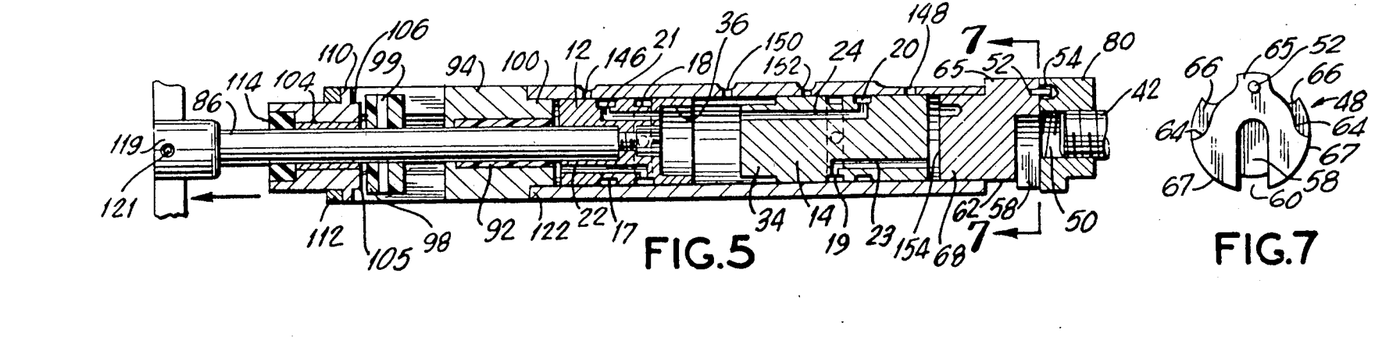
FIG. 5 is a cross sectional view of the air motor as shown in FIG. 3 with the drive piston fully extended at the end of its stroke.
FIG. 7 is an end view of a second half of a tandem muffler taken along line 7—7 of FIG. 5.

Referring to FIG. 2, the air motor 10 is now described beginning at the air feed end of the motor and continuing forward. An air feed tube 38 is made of a suitable material such as plastic. The end of tube 38 which feeds air into motor 10 terminates in and is held in a metal connector 40 (FIG. 1). Connector 40 has one end 42 which is threaded. Connector 40 is threadedly engaged with a tandem muffler 44 which consists of a first half 46 (FIG. 6) and a second half 48 (FIG. 7). The first half 46 of the tandem muffler 44 has a threaded center hole 50 which receives threaded end 42 of the connector 40. The second half 48 of the muffler is mated with the first half 46 of the muffler and the halves are in contact with one another. Locating pin 52 is inserted in locating hole 54 to cause the halves of the muffler to align to form air paths which reduce vibrations and noise. As will be more fully explained, the tandem muffler 44 and cylinder 16 are housed in an outer cylindrical casing 56 which cooperates with the muffler and cylinder to form air paths which are air tight with respect to one another. The outer diameter of the muffler is the same as the outer diameter of the cylinder 16. When the muffler 44 is inserted into casing 56, air paths are formed between the muffler 44 and the casing 56. In particular, air entering center hole 50 in the first half 46 of the muffler, exits through a U-shaped trough 58 in the second half of the muffler into a feed path 60 formed by a reduced diameter area 62 and the casing 56.

The second half 48 of the muffler has grooves 64 of varying size which are formed on each side of a wall 65 and cooperate with casing 56 to form exhaust paths 66. Wall 65 divides the exhaust paths to form two identical and physically separate exhaust paths. In addition walls 67 divide the exhaust paths from the air feed path 60. The outer diameter of the walls 65, 67 is the same as the outer diameter of the cylinder 16. The tight fit between the outer diameter of walls 65, 67 and casing 56 keeps air from crossing between the feed and exhaust paths.

Figure 6:
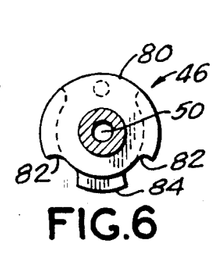
FIG. 6 is an end view of a first half of a tandem muffler taken along line 6—6 of FIG. 4.

The second half 48 of the muffler 44 has a cylindrical forward portion 68 which is inserted into the back end 69 of cylinder 16 until the front face 70 of wall 65 and the front faces 71 of walls 67 come to rest against the back end 69 of cylinder 16. The outer diameter of forward portion 68 is the same as the diameter of the outer cylindrical surfaces 26 and 30 of the pistons 12, 14, respectively. When inserting forward portion 68 into cylinder 16, locating pin 72 is inserted in locating notch 74 in cylinder 16 to assure that air feed paths in the muffler align with air feed paths in the cylinder, and air exhaust paths in the cylinder align with exhaust paths in the muffler. The first half 46 of the muffler 44 has a wall 80 which separates reduced diameter portions to form two exhaust paths 82 which align with exhaust paths 66 in the second half 48 of the muffler 44. Wall 84 separates air feed path 60 from the exhaust paths 82. The outer diameter of the walls 80, 84 is the same as the outer diameter of the cylinder 16. The tight fit between the walls 80, 84 and the casing 56 keeps air from crossing between the feed and exhaust paths.

Cylinder 16 and tandem muffler 44 are inserted into casing 56. The outer surface of cylinder 16 cooperates with the inner cylindrical surface of casing 56 to form air feed paths 76 and exhaust paths 78. In FIG. 1, a single air feed path 76 is shown. There is another air feed path (not shown) symmetrically positioned on the other side of the bottom part of cylinder 16 spaced from the shown path. The two paths provide inlet air to the piston from opposing sides to keep the piston centrally oriented in the cylinder. There are also air exhaust paths (not shown) symmetrically positioned on the other side of the top of cylinder 16, but forming part of a unitary flow arrangement. In addition, the outer surfaces of the walls 65, 67, 80, 84 of the muffler cooperate with the inner cylindrical surface of casing 56 to form air feed path 60 and exhaust paths 66, 82. There is a tight fit between the walls 65, 67, 80, 84 and the casing to keep air from leaking between the air feed paths and exhaust path in the tandem muffler 44.

The drive piston 12 is connected to a shaft 86 by a set screw 88 which is positioned in the center of the piston 12. The set screw forms an air tight seal with the piston 12. Shaft 86 rides on a cylindrical Roulon bearing 92, which is axially mounted in a bearing support 94. The outer diameter of the bearing support is the same as the outer diameter of the cylinder 16. The bearing support includes a notch 96 in which an anti-rotation guide 98 rides and is fixed to shaft 86. The guide 98 may be made of a material such as nylon in order to smoothly ride in the notch. Pin 99 is used to securely fix the guide onto the shaft by extending through the aligned holes 101 in guide 98 and 103 in the shaft. The bearing support 94 has a reduced diameter rearward protrusion 100 which has the same diameter as the pistons 12, 14 and fits within cylinder 16.

Shaft 86 continues through nose piece 102 which also has a bearing 104 to support the shaft 86. The back end 105 of the nose piece 102 has a reduced diameter portion 106 which fits within a cylindrical opening 108 in the front end of the bearing support 94. The nose piece 102 fits partially within casing 56 and has a flange 110 which is of a diameter slightly less than the inner diameter of the casing 56 and is the same as the diameter of the cylinder 16. A plastic washer 112 is seated on nose piece 102 adjacent flange 110. In addition at the point where shaft 86 exits the nose piece, the shaft rides in a wiper seal 114. A saw generally designated as 116 which includes a blade 118 is mounted on the end of the shaft by a nipple 119 which is fixed to the shaft by a pin 120. The saw 116 is held in nipple 119 by a set screw 121 (FIG. 2).

The air motor 10 may be assembled by first placing shaft 86 through bearing 104 in nose piece 102. Guide 98 is fixed to the shaft and rides in notch 96 in bearing support 94. The shaft is then inserted through bearing 92 and the drive piston 12 is screwed onto the end of shaft 86 with set screw 88. The drive piston 12 is then inserted into the front end of cylinder 16 and the reduced diameter protrusion 100 of the bearing support 94 is inserted into cylinder 16 until the back end 122 of support 94 contacts cylinder 16.

The anti-phase piston 14 is next inserted into cylinder 16 with protrusion 34 facing piston 12. The forward portion 68 of the second half 48 of the tandem muffler 44 is inserted into cylinder 16 and locating pin 72 is seated in locating notch 74. The front faces of walls 65, 67 contact the cylinder 16. The parts thus far assembled are placed in casing 56. Next, the connector 40 which is on the end of tube 38, is screwed into the first half 46 of the muffler 44. The first half 46 is then placed against the second half 48 with locating pin 52 inserted in locating hole 54. A bushing 123 is inserted into the folded back end 123A of a flexible hose 124 and held in place by a spring ring 125. The bushing 123 is secured against the end of casing 56 by end cap 126 which is threaded onto casing 56. The diameter of bushing 123 at the point where it contacts casing 56 is the same as that of the casing. Washer 112 is next placed onto nose piece 102 and the other end of casing 56 is closed by end cap 128 which is threaded onto casing 56.

The combined axial length of the motor parts which are housed in the casing 56, i.e., the length of the tandem muffler 44, the cylinder 16, the bearing support 94, the flange 110 and washer 112, is slightly longer than the casing 56. When end caps 126, 128 are tightened, end cap 126 pushes bushing 123 into contact with casing 56 and first half 46 of the muffler, and end cap 128 contacts washer 112. As the end caps are tightened, the motor parts in the casing are squeezed against one another and are locked against rotation and held firmly in place.

A porous strip of material such as foam strip 129 is spirally wound about tube 38. The foam strip 129 may be glued to tube 38 to hold it in place. The foam acts to absorb some of the noise of the air exhausting through hose 124.

As shown in FIG. 3, there is an alternate construction using a cylindrical thin plastic sleeve 130 which fits within casing 56 and over cylinder 16 and muffler 44. The inside diameter of casing 56 is slightly enlarged over the length of sleeve 130 to accommodate the thickness of the sleeve. The inside diameter of the sleeve 130 is only slightly larger than the outside diameter of cylinder 16 and muffler 44 so that a tight force fit exists between the sleeve and the cylinder and muffler, to form air pathways as was formed with the casing. The sleeve 130 may be used to avoid accurate metal machining and finishing. However, the use of a sleeve is optional.

As shown in FIG. 2, the air inlet tube 38 runs through flexible tube 124 and exits away from the immediate area of the motor. Tube 38 is connected to an air switch such as a foot pedal 132 which is connected by an air line 134 to a source of compressed air (not shown). A hand grip 136 which may be made of soft rubber is placed over casing 56. Of course, if a hand grip is used, it must be placed onto casing 56 before assembling the motor. The hand grip 136 has a finger stop 138 and a thumb rest 140. The hand grip keeps the motor from slipping in an operators hand and also provides comfort by further cushioning vibrations.

Figure 4:
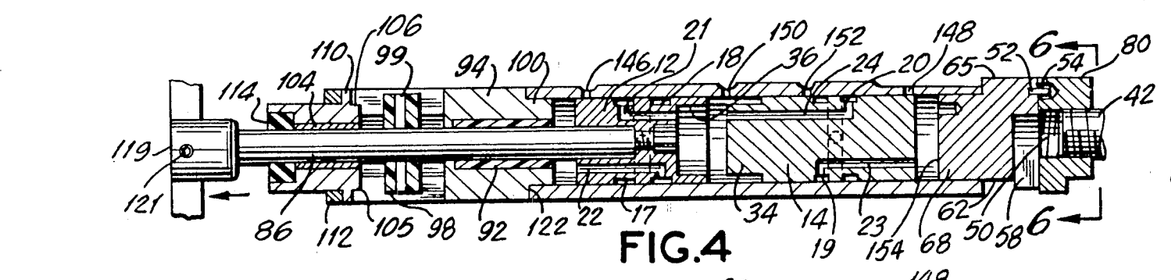
FIG. 4 is a cross sectional view of the air motor as shown in FIG. 3 with the drive piston part way through its stroke.
Figure 8:
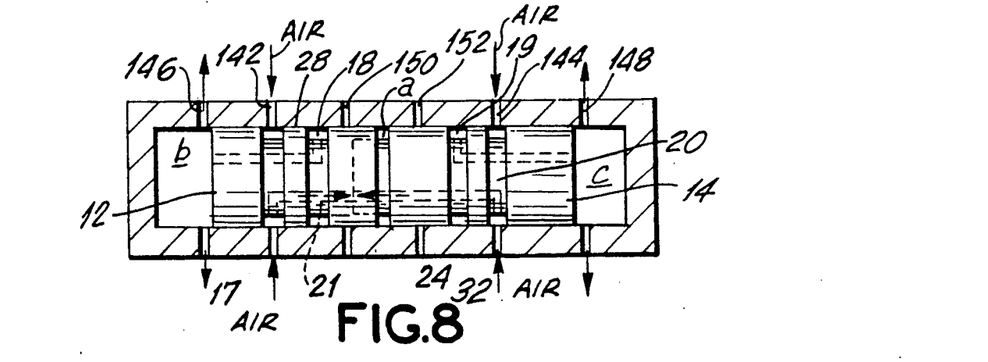
FIG. 8 is a schematic view of the drive and anti-phase pistons in their fully retracted positions as shown in FIG. 3.

In order to use saw 116, an operator takes the air motor 10 and places hand grip 136 in his hand. Foot pedal 132 is depressed to connect the compressed air in line 134 to tube 38. The compressed air enters the motor through center hole 50 in the first half of the muffler 44 and flows through U-shaped trough 58 and feed path 60 in the second half of the muffler into air feed paths 76 in cylinder 16. Assuming the pistons are in their fully retracted position as shown in FIG. 3 and schematically in FIG. 8, air in feed paths 76 flows through inlet ports 142, 144 into annular inlets 17, 20 in pistons 12, 14, respectively. The air flows through tunnels 21, 24 and exits in the direction of the arrow heads as shown in FIG. 8. The air fills the chamber a between the pistons and since air exhaust ports 146, 148 are open, i.e. not closed by pistons 12, 14, respectively, there is minimal resistance to the pistons 12, 14 moving away from one another. Exhaust ports 150, 152 are closed by pistons 12, 14, respectively. As the air forces the pistons apart, inlet ports 142, 144 are closed by separation rings 28, 32, respectively. This position is referred to as the transition position and is shown in FIG. 4 and schematically in FIG. 9.

Figure 9:
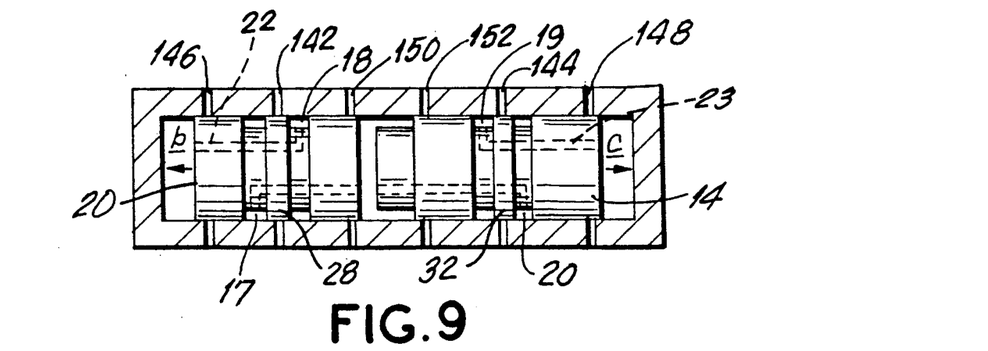
FIG. 9 is a schematic view of the drive and anti-phase pistons in transition part way through their strokes and moving toward the extended position.

Referring to FIG. 9, as pistons 12, 14 continue to move apart, exhaust ports 146, 148 are also closed by the pistons, respectively. Exhaust ports 150 and 152 are also closed. As the pistons continue moving, first by the flow of air into the center chamber c between the pistons and thereafter by continual momentum, the air is trapped in the forward chamber c between the front end of piston 12 and the protrusion 100 of the bearing support 94. The trapped air is compressed and helps cushion the forward motion of the piston. As the piston 12 continues, its associated air inlet port 142 is opened. Air flows into inlet 18 and tunnel 22 and is directed toward chamber b. Similarly, as piston 14 continues moving air is trapped into chamber c between the back end of piston 14 and the front face 154 of the second half of the muffler 44. The trapped air is compressed and helps cushion the rearward motion of the piston. As the piston continues, its associated air inlet port 144 is opened and air flows into inlet 19 and tunnel 23 and is directed toward front face 154 of the second half of the muffler into chamber c. The flow of air into the outer chambers continues until the pressure of the air in the outer chambers is sufficient to overcome the momentum of the pistons and the pistons begin reversing their movement to now approach each other.

Figure 10:
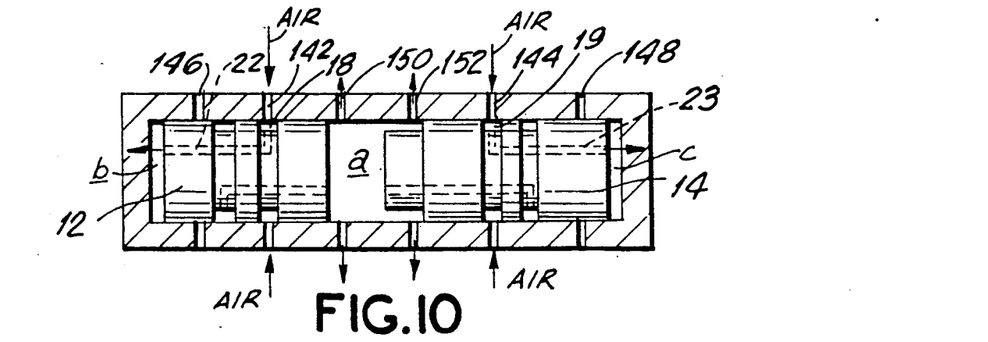
FIG. 10 is a schematic view of the drive and anti-phase pistons in their fully extended positions as shown in FIG. 5.

FIG. 10 shows the pistons as they move to the fully extended position, exhaust ports 146 and 148 are closed by the pistons 12, 14, respectively, exhaust ports 150, 152 are opened by pistons 12, 14, respectively, and inlet ports 142 and 144 are opened by pistons 12, 14, respectively. In the fully extended position, the air compressed at the front end of piston 12 in chamber c and at the back end of piston 14 in chamber c, urges the pistons toward one another. In addition, air is now entering inlet ports 142 and 144. Air entering inlet port 142 flows into air inlet 18 and tunnel 22 and is directed toward chamber c and drives piston 12 back toward piston 14. Air entering inlet port 144 flows into air inlet 19 and tunnel 23 into chamber c and drives piston 14 forward toward piston 12. At the same time, exhaust ports 150 and 152 are opened to permit exhaust of the air from the central chamber c. This permits the two pistons to move toward each other into the fully retracted position.

Figure 11:
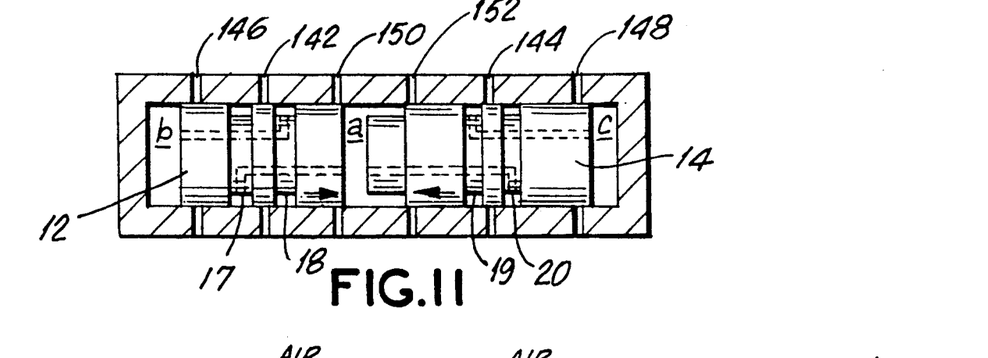
FIG. 11 is a schematic view of the drive and anti-phase pistons in transition part way through their strokes and moving toward the retracted position.

As the pistons continue to move toward one another, inlet ports 142, 144 are therefore closed by separation rings 28, 32, respectively. Exhaust ports 150, 152 are also closed by piston 12, 14, respectively. The pistons 12, 14 are again in the transition position as shown in FIG. 11 and continue to move toward one another through momentum to compress the air in central chamber c. This compressed air helps cushion their inward movement.

As the pistons continue moving, they will open exhaust ports 146, 148 and then inlet ports 142, 144 and come to rest in the fully retracted position shown in FIG. 3 and schematically in FIG. 8. The cycle continues and the pistons in this way reciprocate.

The sizing of the pistons, the spaces between the pistons and the spacing between the ends of the pistons from the protrusion 100 (piston 12) and from the front face 154 of the muffler (piston 14) are carefully selected. The opening and closing of the inlets and exhausts is also integrated with the sizing and spacing of the pistons so that the pistons do not hit one another and piston 12 does not hit protrusion 100 and piston 14 does not hit front face 154 of the muffler. The motor has been designed to provide 7400-7800 strokes per minute from an air pressure of 40-80 pounds per square inch. As the drive piston reciprocates, the anti-phase piston reciprocates in the opposite direction, thereby cancelling the vibrations of the drive piston.

Air exhausting through ports 146, 148, 150, 152 flows into air exhaust paths 78 which have spaced baffles 156 which break up the air flow to further reduce vibration and noise. The exhausting air next flows into exhaust paths 66 in the second half of the muffler 44, into exhaust paths 82 in the first half of the muffler and into hose 124. The circuitous path through the muffler provides vibration and noise dampening. Air inlet tube 38 is surrounded with the spirally wound stripe of porous material 129 such as foam. The foam absorbs some of the noise made by the air exhausting through the hose. The hose terminates away from the immediate vicinity of the operator.

The vibration and noise damping greatly reduces the vibration and noise fatigue which the operator would otherwise be subjected to. The reduced vibration permits the saw to be used for procedures requiring accuracy such as the sawing out of individual teeth from a dental mold.

The vibration cancellation provided by the anti-phase piston will vary depending upon the weight of the drive piston, and the weight of the items connected directly to the drive piston, i.e. shaft 86 and saw 116. There are other influences on the vibration cancellation. e.g. the resistance to reciprocation caused by the bearings 92 and 104. One way to approximate minimizing the vibration of the drive piston is to make the weight of the anti-phase piston 14 equal to the weight of the drive piston 12, shaft 86 and saw 116.

Figure 12:
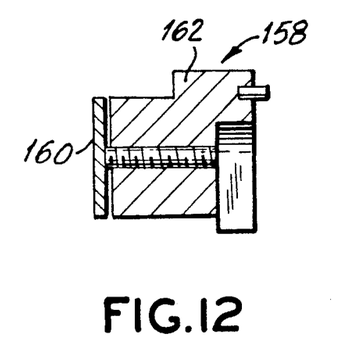
FIG. 12 is a view of the second half of the tandem muffler with an adjustable face plate which varies the volume of the air cushion to permit optimizing the vibration cancellation.

Another way to minimize vibration is to vary the stroke of the anti-phase piston and drive piston. Referring to FIG. 12, an alternate embodiment of a second half of a muffler 158 is shown. The front face 160 is threaded into the body 162 of the muffler 158 and can be moved toward and away from the body 162. The movement of the front face 160 permits the air space between the back end of the piston 14 and the muffler 158 to be varied. Making the air space smaller will cause a greater build-up of pressure when the piston 14 is moving toward the muffler 158 with less of a stroke. The piston 14 will stop sooner and return toward piston 12 causing the front face of piston 14 to move closer to piston 12 with the result that the stroke of piston 12 will be shortened. The optimum position of the front face 162 is determined by experimentation for a given weight of saw, shaft and piston.

Figure 13:
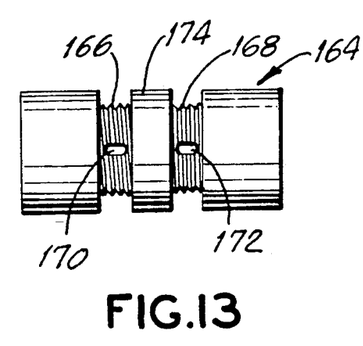
FIG. 13 is a view of an adjustable piston in which the air inlet paths can be adjusted to align with the air feeds.

Referring to FIG. 13, an alternate embodiment of the pistons 12, 14 is shown. Piston 164 has threaded annular air inlets 166,168. Tunnel entrances 170,172 are oblong rather than round as in pistons 12, 14. There is a separation ring 174 which is threadedly engaged with the annular air inlets 166, 168. Since proper operation of the motor is in part dependent on the separation ring opening and closing the inlet ports 142, 144 at a given part of the pistons strokes, the pistons must be very accurately made. The separation ring 174 can be adjusted by rotating the ring which causes the ring to move along the length of the piston. Manufacturing tolerances on the piston can be relaxed since subsequent adjustment is now possible. Also, the use of oblong tunnel entrances 170, 172 permits the separation ring to be moved without closing off the air flow into the tunnels.

Figure 14:
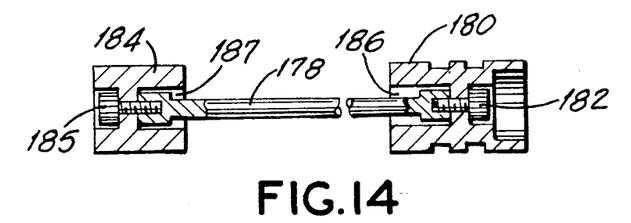
FIG. 14 is another embodiment of the interconnection between the drive piston and the tool using a narrow shaft to accommodate manufacturing tolerances.

Referring to FIG. 14, there is shown an alternate connection between the drive piston and the saw. The alternate connection consists of a shaft 178 which is capable of limited flexing. The shaft is connected to drive piston 180 by a screw 182. The shaft beyond the screw has a reduced diameter which extends through the bearing support 94 and the nose piece 102 and terminates in a mounting 184. The shaft is screwed to the mounting by screw 185. The saw (not shown) is rigidly secured to the mounting. The space 186 in the piston 180 and the space 187 in the mounting 184 around the reduced diameter of the shaft 178 permits less than perfect alignment of the parts of the motor, without causing the motor to lock up and not operate. In particular the alignment of the bearing support 94 and the nose piece 102 with the drive piston 180 is rendered much less critical and a certain amount of skewing can be tolerated.

Figure 15:
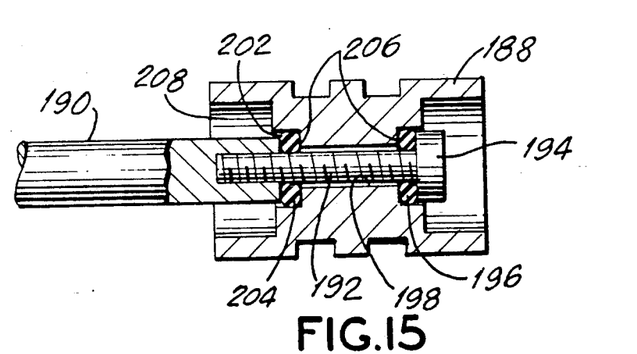
FIG. 15 is a further embodiment of the interconnection between the drive piston and the tool shaft using rubber O-rings which permits multi-directional flexibility to accommodate greater manufacturing tolerances.

Referring to FIG. 15, there is shown another alternate connection between the drive piston and the shaft using O-rings to provide greater flexibility. In particular, drive piston 188 is connected to shaft 190 by a screw 192. The head 194 of the screw abuts an O-ring 196 made of fairly rigid rubber. The screw 192 continues through an enlarged opening 198 in the piston 188 and is engaged with shaft 190. The end 202 of the shaft 190 abuts a second o-ring 204 made of fairly rigid rubber. When screw 192 is tightened, the end 202 of shaft 190 and the screw head 194 compress the O-rings against the lips 206 of the piston and forms an air tight seal. Since the diameter of shaft 190 is smaller than the diameter of the opening 208 in the piston, there is room for multidirectional flexing of the shaft. The force necessary to produce flexing is adjustable and a function of how tight screw 192 is made against the o-ring force. Accordingly, the o-ring connection gives greater relief in manufacturing tolerances since the flexing of the shaft is adjustable.

Figure 17:
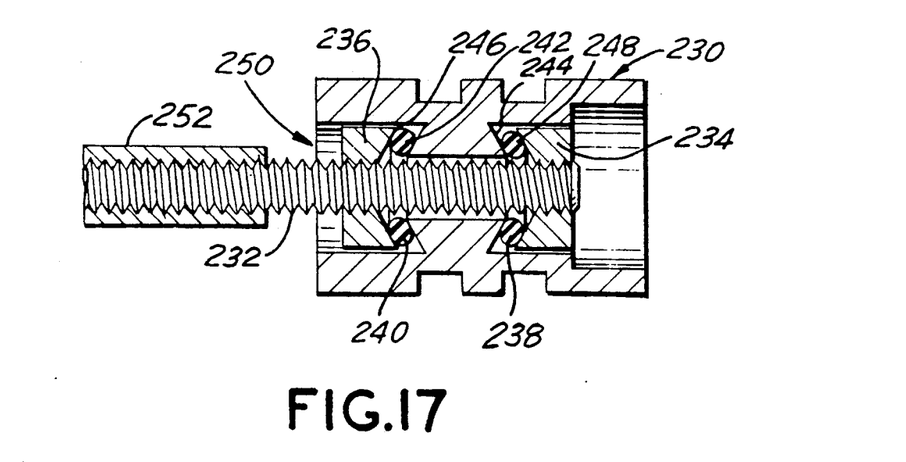
FIG. 17 is yet a further embodiment of the interconnection between the drive piston and the tool shaft using rubber O-rings and angled clamp into interfaces to further permit multidirectional flexibility to accommodate greater manufacturing tolerances.

Refer now to FIG. 17, there is shown yet another alternate of the interconnection between the drive piston and the shaft to provide flexibility. The drive piston 230 is connected to a threaded shaft 232 by means of a pair of clamping nuts 234, 236 respectively at the forward and rear end of the drive piston 230. A pair of O-rings 238, 240 are respectively sandwiched between the clamping must 234, 236 and the body of the drive piston 230. The engaging front and rear surfaces of the drive piston 242, 244 are radially angled in respectively outward directions from the midsection of the drive piston toward the respective outer ends. The radial angle is directed toward the axis. Correspondingly, the front engaging surfaces, 246, 248 of the nuts 234, 236 are likewise angled toward the center to matingly correspond to the shape of the angled surfaces of the drive piston 230. These surfaces sandwich the O-ring therebetween.

The arrangement shown in FIG. 7 is a self centering arrangement which allows for misalignment of the piston with respect to the cylinder. It will be noted that the shaft 232 has room as shown by the space 250 for some flexing due to misalignment. Furthermore, the shaft threads into an outer sleeve 252 downstream thereof and thereafter engages into the bearings, and the front end mechanism heretofore described and finally couples to the saw arrangement. This arrangement also allows a lighter front end mechanism and provides for easier assembly of the part. Through the use of the angle interfaces, it permits rotation of the parts in a manner similar to a ball joint.

Figure 16:
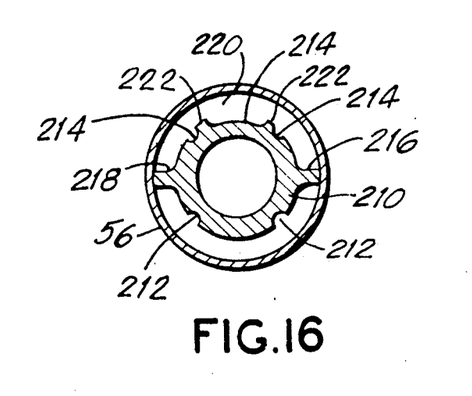
FIG. 16 is another embodiment of the air motor using barrier seals to isolate the air feed paths from the air exhaust paths so that relaxed manufacturing tolerances may be accommodated.

Referring to FIG. 16, there is shown an alternate embodiment of the cylinder 16 and casing 56. Cylinder 210 has air feed paths 212 and air exhaust paths 214 identical with those described with respect to cylinder 16. Cylinder 16 relies on a close fit between the outer surfaces of the cylinder 16 and the inside surface of casing 56 to prevent air from crossing between the air feed paths and the air exhaust paths. Cylinder 210 is provided with barrier walls 216, 218 which cooperate with the inside surface of the casing 56 to form an air-tight seal which prevents air from crossing between the feed and exhaust paths. The space 220 between cylinder 210 and casing 56 is shown exaggerated to facilitate the clarity of the description. In practice, the outer surface of cylinder 210 is made slightly smaller than the outer surface of cylinder 16 and the barrier walls 216, 218 extend to the same diameter as the outer surface of cylinder 16. The barrier walls are preferably integral with the cylinder 210. The use of the barrier walls permits the relaxation of the tolerances which apply to the remainder of the outer surfaces of the cylinder.

The use of baffles 222 reduces noise by causing air to travel around the baffles. Since reducing the diameter of the outer surfaces of the cylinder 210 somewhat reduces the effectiveness of the baffles by permitting air to escape over the baffles, the baffles may be eliminated thereby greater simplifying the manufacturability of the cylinder 210.

There has been described heretofore a preferred embodiment and alternate embodiments of the invention. It should be understood that various changes and modifications may be made thereto without departing from the spirit and scope of the invention.

What is claimed is:

1. A reciprocating motor in which a fluid causes a drive piston to reciprocate, comprising:
   a cylinder;
   a drive piston positioned in said cylinder for reciprocation therein;
   an anti-phase piston positioned in said cylinder for reciprocation in the opposite direction of said drive piston;
   means for delivering the fluid to said drive piston and said anti-phase piston; and
   means for feeding the fluid to the ends of the pistons to cause said drive piston and anti-phase piston to move in opposite directions whereby the motion of the anti-phase piston cancels vibrations caused by the drive piston.

2. A reciprocating motor as in claim 1, wherein:
   said fluid is compressed air.

3. A reciprocating motor according to claim 2, wherein:
   each piston has a first end and a second end, said second end of the drive piston facing the first end of the anti-phase piston, and said first end of the drive piston facing in a direction opposite to the second end of the anti-phase piston;
   said delivering means includes air inlet ports in said cylinder for delivering air to each piston; and
   said feeding means includes means in each piston for sequentially directing the air to the ends of each piston so that the drive piston and the anti-phase piston move in opposite directions.

4. A reciprocating motor according to claim 3, wherein;
   said directing means in each piston comprises a first air inlet and tunnel in each piston which directs air toward the second end of the drive piston and the first end of the anti-phase piston, and a second air inlet and tunnel in each piston which directs air toward the first end of the drive piston and the second end of the anti-phase piston; and
   said air inlet ports in said cylinder sequentially deliver air to the first air inlet in each piston and the second air inlet in each piston to cause the drive piston and anti-phase piston to move in opposite directions.

5. A reciprocating motor according to claim 4, wherein:
   said delivering means further includes an air feed path in said cylinder leading to said air inlet ports and baffles for redirecting the flow of air in said air feed path to reduce vibration and noise.

6. A reciprocating motor according to claim 5, wherein:
   said compressed air delivering means further comprises a muffler for delivering air to the air feed path in said cylinder, said muffler having walls around which the air flows to further reduce vibration and noise caused by air flowing to the pistons.

7. A reciprocating motor according to claim 6, wherein:
   one end of the muffler faces the second end of the anti-phase piston, said end of the muffler being adjustable toward and away from the second end of the anti-phase piston to vary the space between the end of the piston and the muffler which causes the stroke of the anti-phase piston to change and thereby permits optimizing the vibration cancellation.

8. A reciprocating motor according to claim 4, wherein there is further provided:
   means for exhausting air which has caused the piston to move, which means includes air exhaust ports in said cylinder connected to an air exhaust path in said cylinder.

9. A reciprocating motor according to claim 8, wherein:
   said exhaust means further includes baffles for redirecting the flow of air in said air exhaust path to reduce vibration and noise.

10. A reciprocating motor according to claim 9, wherein:
    said muffler has an exhaust path with walls around which the exhausting air flows to further reduce noise and vibration.

11. A reciprocating motor according to claim 10, wherein:
    said means for delivering compressed air further includes an air inlet tube connected to said muffler;
    a hose surrounding the air inlet tube and defining a space between the air inlet tube and the hose through which the exhausting air flows; and
    a porous strip of material wound about the tube to absorb some of the noise of the exhausting air.

12. A reciprocating air saw, comprising:
    a casing;
    a cylinder in said casing having at least an air feed path and ports and at least an air exhaust path and ports, said air feed path being in constant communication with a compressed air source;
    a drive piston having a front end and a back end coaxially positioned in said cylinder for reciprocation therein;
    an anti-phase piston having a front end and a back end coaxially positioned in said cylinder for reciprocation therein, said front end of the anti-phase piston facing the back end of the drive piston;
    means for connecting a saw to said drive piston to reciprocate therewith; and
    means for causing reciprocation of the pistons by sequentially delivering compressed air to a space between the front end of the anti-phase piston and the back end of the drive piston to force the piston apart, and for sequentially delivering compressed air to a space in front of the front end of the drive piston and to a space behind the back end of the anti-phase piston to force the pistons toward each other, whereby vibrations of the reciprocating drive piston are cancelled by the anti-phase reciprocations of the anti-phase piston.

13. A reciprocating air saw according to claim 12, wherein:
   means are provided for varying the size of the space behind the back end of the anti-phase piston which causes the length of the reciprocations of the pistons to vary thereby permitting optimization of the vibration cancellation.

14. A reciprocating air saw according to claim 12, wherein:
   said means for connecting the saw to the drive piston is a shaft fixed at one end to said drive piston and at the other end to a mounting for the saw, said piston having an internal space for receiving an end of the shaft, said space being larger than the end of said shaft so there is room for limited flexing of the shaft within the piston to compensate for misalignment of the parts of the air saw.

15. A reciprocating air saw according to claim 14, wherein:
   said end of the shaft which is fixed to said drive piston is held by a screw arrangement, and a first compressible O-ring positioned at one end of the drive piston engaging one end of the shaft, and a second compressible O-ring positioned between the other end of the drive piston and an intermediate portion of the shaft, whereby the O-rings provide the shaft with flexibility to compensate for misalignment of the parts of the air saw.

16. A reciprocating air saw according to claim 15, wherein:
   said ends of said piston facing said O-rings is radially angled toward a central axis of the piston, and wherein said screw arrangement comprises a nut engaging the shaft and comprising each O-ring, the nut having a face mating said radially angled faces of said piston.

17. A reciprocating air saw in accordance with claim 12, wherein:
   a cylindrical sleeve is provided which tightly fits about the cylinder and within the casing, and cooperates with the outer diameter of the cylinder to keep the air feed path and air exhaust path airtight and separate.

18. A reciprocating air saw according to claim 12, wherein:
   said cylinder has barrier walls between the air feed path and the air exhaust path, said barrier walls cooperating with the inside surface of the casing to keep the air feed path and air exhaust path airtight and separate.

19. A reciprocating air saw according to claim 12, wherein:
   said anti-phase piston approximates the weight of the drive piston, connecting means and saw to enhance the vibration cancellation.

20. A vibration cancelling mechanism for a reciprocating piston air motor wherein a drive piston reciprocates within a cylinder, comprising:
   a cylinder which is closed at its front end and at its back end and having air inlet means and air exhaust means in communication with the interior of the cylinder;
   a drive piston having a front end and a back end placed in the cylinder for reciprocal sliding movement therein;
   an anti-phase piston having a front end and a back end placed in the cylinder adjacent the drive piston for reciprocal sliding movement therein;
   a first air space defined at least in part by the front end of the cylinder and the front end of the drive piston;
   a second air space defined at least in part by the front end of the anti-phase piston and the back end of the drive piston;
   a third air space defined at least in part by the back end of the anti-phase piston and the back end of the cylinder;
   said air inlet means delivering air to said first and third spaces to move the pistons toward one another to compress the air in said second air space between the pistons, said first and third air spaces coming into communication with said air exhaust means during the movement of the pistons toward one another, said compressed air the second air space in part preventing the pistons from striking one another;
   said air inlet means delivering air to said second air space at a predetermined point in the movement of the pistons toward one another to move the pistons away from one another, said exhaust means during movement of the pistons away from one another being brought out by communication with said first and third air spaces so that air is compressed by the drive piston in the first space and by the anti-phase piston in the third space and into communication with said second air space, said compressed air in part preventing the drive piston and the anti-phase piston from striking the front and back ends of the cylinder, respectively;
   said air inlet means delivering air again to said first and third air spaces at a predetermined point in the movement of the pistons away from one another to again move the pistons toward one another and said exhaust means during movement of the pistons toward one another being brought out of communication with said second space to permit the air therein to compress and into communication with said first and third air spaces; and
   said air inlet means alternately delivering air to the first and third air spaces and then to the second air space causing the anti-phase piston to move in the direction opposite to the movement of the drive piston to cancel vibrations caused by the drive piston.

21. A vibration cancelling mechanism according to claim 20, wherein:
   said drive piston has a first air inlet and a second air inlet, and said anti-phase piston has a first air inlet and a second air inlet, said first air inlet of said drive piston and said second air inlet of said anti-phase piston being in simultaneous communication with the air inlet means in the cylinder to deliver air to the second air space, and said second air inlet in said drive piston and said first air inlet in said anti-phase piston being in simultaneous communication with the air inlet means in the cylinder to deliver air to the first and third air spaces, respectively.

22. A vibration cancelling mechanism according to claim 21, wherein:
   the drive piston and the anti-phase piston each have a separation ring which separates the first and second air inlets in each piston, said separation rings being adjustable to bring the air inlets in the pistons into communication with the air inlet means in the cylinder.

23. A vibration cancelling mechanism according to claim 21, wherein:
said back end of the cylinder is adjustable toward and away from the back end of the anti-phase piston to vary the pressure build up in the third space and thereby change the vibration cancellation characteristics of the anti-phase piston.

* * * * *